US010819831B2

(12) United States Patent
Masputra et al.

(10) Patent No.: US 10,819,831 B2
(45) Date of Patent: Oct. 27, 2020

(54) METHODS AND APPARATUS FOR CHANNEL DEFUNCT WITHIN USER SPACE STACK ARCHITECTURES

(71) Applicant: Apple Inc., Cupertino, CA (US)

(72) Inventors: Cahya Adiansyah Masputra, Cupertino, CA (US); Thomas Francis Pauly, Cupertino, CA (US); Darrin Jewell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 16/146,916

(22) Filed: Sep. 28, 2018

(65) Prior Publication Data

US 2019/0303280 A1 Oct. 3, 2019

Related U.S. Application Data

(60) Provisional application No. 62/649,509, filed on Mar. 28, 2018.

(51) Int. Cl.
*H04L 12/743* (2013.01)
*H04L 29/06* (2006.01)
(Continued)

(52) U.S. Cl.
CPC .......... *H04L 69/162* (2013.01); *G06F 3/0604* (2013.01); *G06F 3/0631* (2013.01);
(Continued)

(58) Field of Classification Search
CPC .......... G06F 9/54; G06F 9/5061; G06F 13/00; G06F 12/023
See application file for complete search history.

(56) References Cited

U.S. PATENT DOCUMENTS 5,367,688 A 11/1994 Croll
6,032,179 A 2/2000 Osborne
(Continued)

OTHER PUBLICATIONS

Gopalakrishnan, et al., Efficient User-Space Protocol Impementations with QoS Guarantees Using Real-Time Upcalls (1998).

*Primary Examiner* — Ryan Bertram
*Assistant Examiner* — Trang K Ta
(74) *Attorney, Agent, or Firm* — Gazdzinski & Associates, PC

(57) ABSTRACT

Methods and apparatus for efficient data transfer within a user space network stack. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. Direct transfer reduces the per-byte and per-packet costs relative to socket based communication. A user space networking stack is disclosed that enables extensible, cross-platform-capable, user space control of the networking protocol stack functionality. The user space networking stack facilitates tighter integration between the protocol layers (including TLS) and the application or daemon. Exemplary systems can support multiple networking protocol stack instances (including an in-kernel traditional network stack).

20 Claims, 15 Drawing Sheets

(51) Int. Cl.
| | |
|---|---|
| *H04L 12/46* | (2006.01) |
| *G06F 9/54* | (2006.01) |
| *G06F 9/48* | (2006.01) |
| *G06F 9/50* | (2006.01) |
| *G06F 12/10* | (2016.01) |
| *G06F 13/16* | (2006.01) |
| *G06F 3/06* | (2006.01) |
| *G06F 9/46* | (2006.01) |
| *G06F 12/02* | (2006.01) |
| *H04L 12/859* | (2013.01) |
| *H04L 12/851* | (2013.01) |
| *H04L 12/863* | (2013.01) |
| *H04L 12/935* | (2013.01) |
| *H04L 12/861* | (2013.01) |
| *G06F 9/455* | (2018.01) |
| *H04L 12/801* | (2013.01) |
| *H04L 12/841* | (2013.01) |
| *G06F 9/52* | (2006.01) |
| *H04L 12/26* | (2006.01) |
| *G06F 16/23* | (2019.01) |
| *G06F 21/52* | (2013.01) |
| *H04L 12/833* | (2013.01) |
| *H04L 12/835* | (2013.01) |
| *H04L 12/823* | (2013.01) |
| *H04L 12/865* | (2013.01) |
| *G06F 21/56* | (2013.01) |
| *G06F 16/22* | (2019.01) |
| *H04L 29/12* | (2006.01) |
| *H04L 29/08* | (2006.01) |
| *H04L 1/00* | (2006.01) |

(52) U.S. Cl.
CPC .......... *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(56) References Cited

U.S. PATENT DOCUMENTS

| | | | |
|---|---|---|---|
| 7,100,020 | B1 | 8/2006 | Brightman et al. |
| 7,152,231 | B1 | 12/2006 | Galluscio et al. |
| 7,398,382 | B2 | 7/2008 | Rothman et al. |
| 7,403,542 | B1 | 7/2008 | Thompson |
| 7,506,084 | B2 | 3/2009 | Moertl et al. |
| 7,587,575 | B2 | 9/2009 | Moertl et al. |
| 7,590,817 | B2 | 9/2009 | Moertl et al. |
| 7,617,377 | B2 | 11/2009 | Moertl et al. |
| 7,941,682 | B2 | 5/2011 | Adams |
| 8,214,707 | B2 | 7/2012 | Munson et al. |
| 8,230,248 | B2 | 7/2012 | Dance et al. |
| 8,255,725 | B2 | 8/2012 | Shimazaki et al. |
| 8,352,624 | B2 | 1/2013 | Zimmerman et al. |
| 8,555,099 | B2 | 10/2013 | Marinkovic et al. |
| 8,769,168 | B2 | 7/2014 | Moertl et al. |
| 9,049,179 | B2 | 6/2015 | Luna |
| 9,170,957 | B2 | 10/2015 | Touzni et al. |
| 9,280,360 | B2 | 3/2016 | Xu et al. |
| 9,594,718 | B2 | 3/2017 | Kaushik et al. |
| 9,959,124 | B1 | 5/2018 | Herbeck et al. |
| 9,985,904 | B2 | 5/2018 | Shalev et al. |
| 10,230,608 | B2 | 3/2019 | Tsirkin |
| 10,289,555 | B1 | 5/2019 | Michaud |
| 10,331,600 | B1 | 6/2019 | Rajadnya et al. |
| 10,534,601 | B1 | 1/2020 | Venkata |
| 2001/0037410 | A1 | 11/2001 | Gardner |
| 2002/0053011 | A1 | 5/2002 | Aiken |
| 2002/0169938 | A1 | 11/2002 | Scott et al. |
| 2003/0061395 | A1 | 3/2003 | Kingsbury et al. |
| 2004/0010473 | A1 | 1/2004 | Hsu |
| 2005/0076244 | A1* | 4/2005 | Watanabe ............ H04W 12/06 726/4 |
| 2005/0278498 | A1 | 12/2005 | Ahluwalia |
| 2007/0183418 | A1 | 8/2007 | Riddoch |
| 2007/0226375 | A1 | 9/2007 | Chu et al. |
| 2008/0005794 | A1 | 1/2008 | Inoue et al. |
| 2008/0127292 | A1 | 5/2008 | Cooper et al. |
| 2008/0148291 | A1 | 6/2008 | Huang et al. |
| 2009/0265723 | A1 | 10/2009 | Mochizuki |
| 2010/0005014 | A1 | 1/2010 | Castle et al. |
| 2010/0017655 | A1 | 1/2010 | Gooding et al. |
| 2010/0049876 | A1 | 2/2010 | Pope et al. |
| 2010/0118041 | A1 | 5/2010 | Chen |
| 2011/0035575 | A1 | 2/2011 | Kwon et al. |
| 2011/0083002 | A1 | 4/2011 | Albers et al. |
| 2011/0161619 | A1 | 6/2011 | Kaminski |
| 2011/0219208 | A1 | 9/2011 | Asaad et al. |
| 2011/0246742 | A1 | 10/2011 | Kogen et al. |
| 2011/0292936 | A1* | 12/2011 | Wang ..................... H04L 45/24 370/389 |
| 2012/0036334 | A1 | 2/2012 | Horman |
| 2012/0203880 | A1* | 8/2012 | Kluyt ..................... G06F 9/54 709/223 |
| 2012/0260017 | A1 | 10/2012 | Mine et al. |
| 2013/0067188 | A1 | 3/2013 | Mehra et al. |
| 2013/0204927 | A1* | 8/2013 | Kruglikov ................. G06F 9/54 709/203 |
| 2013/0205113 | A1* | 8/2013 | Ahmad ................. G06F 12/023 711/170 |
| 2013/0275976 | A1* | 10/2013 | Dawson ................. G06F 9/5061 718/1 |
| 2014/0068624 | A1 | 3/2014 | Fuller et al. |
| 2014/0068636 | A1 | 3/2014 | Dupont et al. |
| 2014/0122695 | A1 | 5/2014 | Kulikov et al. |
| 2014/0189057 | A1 | 7/2014 | Sankoda et al. |
| 2014/0355606 | A1 | 12/2014 | Riddoch et al. |
| 2015/0007262 | A1* | 1/2015 | Aissi ..................... H04L 9/0869 726/2 |
| 2015/0081985 | A1 | 3/2015 | Archer et al. |
| 2015/0156122 | A1 | 6/2015 | Singh et al. |
| 2015/0172345 | A1 | 6/2015 | Mantin et al. |
| 2015/0244804 | A1 | 8/2015 | Warfield et al. |
| 2015/0261588 | A1 | 9/2015 | Liu et al. |
| 2015/0326542 | A1 | 11/2015 | Serebrin |

(56) References Cited

U.S. PATENT DOCUMENTS

| | | |
|---|---|---|
| 2015/0363110 A1 | 12/2015 | Batra et al. |
| 2016/0044143 A1 | 2/2016 | Narasimhamurthy |
| 2016/0103480 A1 | 4/2016 | Sanghi et al. |
| 2016/0226957 A1 | 8/2016 | Zhang et al. |
| 2016/0226967 A1 | 8/2016 | Zhang |
| 2016/0231929 A1 | 8/2016 | Tsirkin |
| 2016/0261632 A1* | 9/2016 | Kolhi ................. H04L 67/10 |
| 2016/0357443 A1 | 12/2016 | Li et al. |
| 2016/0378545 A1 | 12/2016 | Ho |
| 2017/0003997 A1 | 1/2017 | Kelly |
| 2017/0075856 A1 | 3/2017 | Suzue |
| 2017/0111283 A1 | 4/2017 | Kumar et al. |
| 2017/0147282 A1 | 5/2017 | Seo |
| 2017/0187621 A1 | 6/2017 | Shalev et al. |
| 2017/0187846 A1 | 6/2017 | Shalev et al. |
| 2017/0264497 A1 | 9/2017 | Lim |
| 2017/0286322 A1 | 10/2017 | Garg et al. |
| 2017/0337588 A1 | 11/2017 | Chittilappilly et al. |
| 2017/0371591 A1 | 12/2017 | Xia et al. |
| 2018/0004690 A1 | 1/2018 | Kaminski |
| 2018/0173643 A1 | 6/2018 | Yu |
| 2018/0219976 A1* | 8/2018 | Decenzo ............ H04L 65/4084 |
| 2018/0239657 A1 | 8/2018 | Petrbok et al. |
| 2018/0295052 A1 | 10/2018 | St-Laurent |
| 2018/0357176 A1 | 12/2018 | Wang |
| 2019/0036893 A1 | 1/2019 | Jiang |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0253351 A1* | 8/2019 | Ihlar ..................... G06F 13/00 |

* cited by examiner

METHODS AND APPARATUS FOR CHANNEL DEFUNCT WITHIN USER SPACE STACK ARCHITECTURES

PRIORITY

This application claims the benefit of priority to U.S. Provisional Patent Application Ser. No. 62/649,509 filed Mar. 28, 2018 and entitled "Methods and Apparatus for Efficient Data Transfer within User Space Networking Stack Infrastructures", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

DESCRIPTION OF RELATED TECHNOLOGY

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In one aspect, a method for defuncting channels associated with, for example, user space communication stacks is disclosed. In one embodiment, the method includes: marking a channel as defunct for an arena of memory resources; defuncting portions of the arena of memory resources and redirecting the defuncted portions to a formatted page of memory; freeing the defuncted portions of the arena of memory resources in order to generate a defuncted channel; and marking the defuncted channel as readable.

In one variant, the method further includes: attempting to suspend a user space stack; and determining whether the channel can be suspended prior to the marking of the channel as defunct for the arena of memory resources.

In another variant, the determining of whether the channel can be suspended includes determining that the arena of memory resources is associated with a trusted application.

In yet another variant, the defuncting of the portions of the arena of memory resources further includes checking the arena of memory resources for areas that are not defunctable.

In yet another variant, the method further includes: using the arena of memory resources by a first application prior to the marking of the channel as defunct; and using the freed defuncted portions of the arena of memory resources by one or more other applications, the one or more other applications differing from the first application.

In yet another variant, the method further includes: reading the marked defuncted channel; and re-establishing another channel to another arena of memory resources.

In yet another variant, the re-establishing of the another channel is responsive to reading the formatted page of memory.

In another aspect, a system for defuncting channels associated with, for example, user space communication stacks is disclosed. In one embodiment, the system includes: a processing apparatus; and a non-transitory computer readable apparatus that includes a storage medium, the storage medium having one or more computer programs stored thereon, the one or more computer programs, when executed by the processing apparatus, is configured to: mark a channel as defunct for an arena of memory resources; defunct portions of the arena of memory resources and redirect the defuncted portions to a formatted page of memory; free the defuncted portions of the arena of memory resources in order to generate a defuncted channel; and mark the defuncted channel as readable.

In one variant, the system is selected from the group consisting of: a laptop computer, a desktop computer, a tablet, a smart watch, audio/visual systems (e.g., AppleTV), and a smartphone.

In another variant, the one or more computer programs, when executed by the processing apparatus, is further configured to: attempt to suspend a user space stack; and determine whether the channel can be suspended prior to the marking of the channel as defunct for the arena of memory resources.

In yet another variant, the defunct of the portions of the arena of memory resources further includes a check of the arena of memory resources for areas that are not defunctable.

In yet another variant, the check of the arena of memory resources includes a traversal of a linear extent of memory space.

In yet another variant, the formatted page of memory includes a zero-filled memory page.

In yet another aspect, an integrated circuit (IC) device for implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed.

In yet another aspect, a computer readable storage apparatus implementing one or more of the foregoing aspects is disclosed and described. In one embodiment, the computer readable apparatus includes a storage medium, the storage medium having one or more computer programs stored thereon, the one or more computer programs, when executed by a processing apparatus, is configured to: mark a channel as defunct for an arena of memory resources; defunct portions of the arena of memory resources and redirect the defuncted portions to a formatted page of memory; free the defuncted portions of the arena of memory resources in order to generate a defuncted channel; and mark the defuncted channel as readable.

In one variant, the one or more computer programs, when executed by the processing apparatus, is further configured to: attempt to suspend a user space stack; and determine whether the channel can be suspended prior to the marking of the channel as defunct for the arena of memory resources.

In another variant, the determination of whether the channel can be suspended includes determination that the arena of memory resources is associated with a trusted application.

In yet another variant, the trusted application comprises a first party application.

In yet another variant, the defunct of the portions of the arena of memory resources further includes a check of the arena of memory resources for areas that are not defunctable.

In yet another variant, the one or more computer programs, when executed by the processing apparatus, is further configured to: read the marked defuncted channel; and re-establish another channel to another arena of memory resources.

In yet another variant, the re-establishment of the another channel is responsive to a read of the formatted page of memory.

In yet another aspect, a software architecture for implementing one or more of the foregoing aspects is disclosed and described.

Other features and advantages of the present disclosure will immediately be recognized by persons of ordinary skill in the art with reference to the attached drawings and detailed description of exemplary embodiments as given below.

All figures © Copyright 2017-2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication (IPC) link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "Methods and Apparatus for Control of a Jointly Shared Memory-Mapped Region", each of which being incorporated herein by reference in its entirety, it will be recognized by those of ordinary skill that the present disclosure is not so limited to such IPC link architectures.

Existing Network Socket Technologies—

Figure 1:
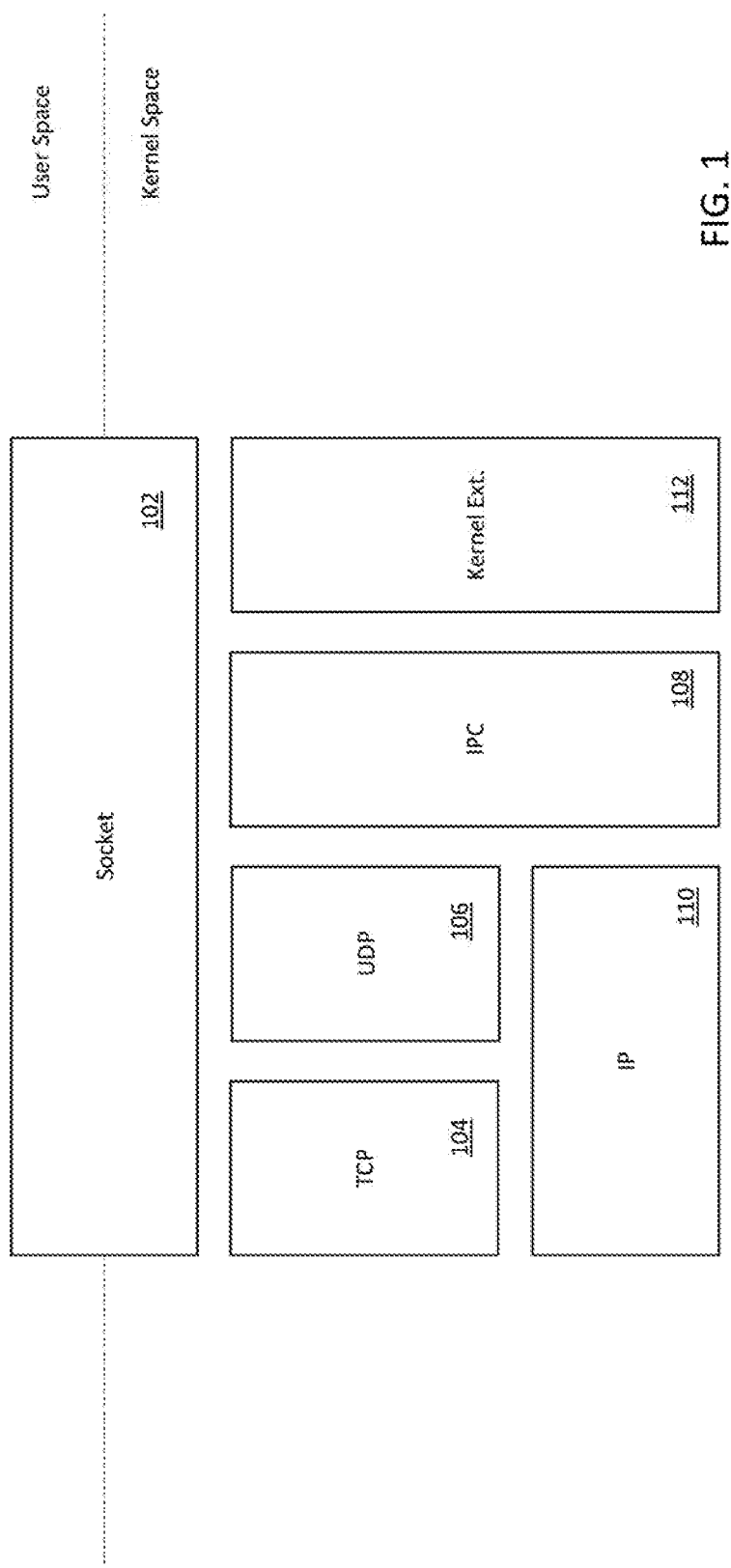
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Process Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Process Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A 3rd party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the 3rd party software developer. This heightened level of access may raise privacy concerns (e.g., the $3^{rd}$ party developer may have access to browsing habits, etc.).

Existing Performance Optimization Technologies—

Figure 2:
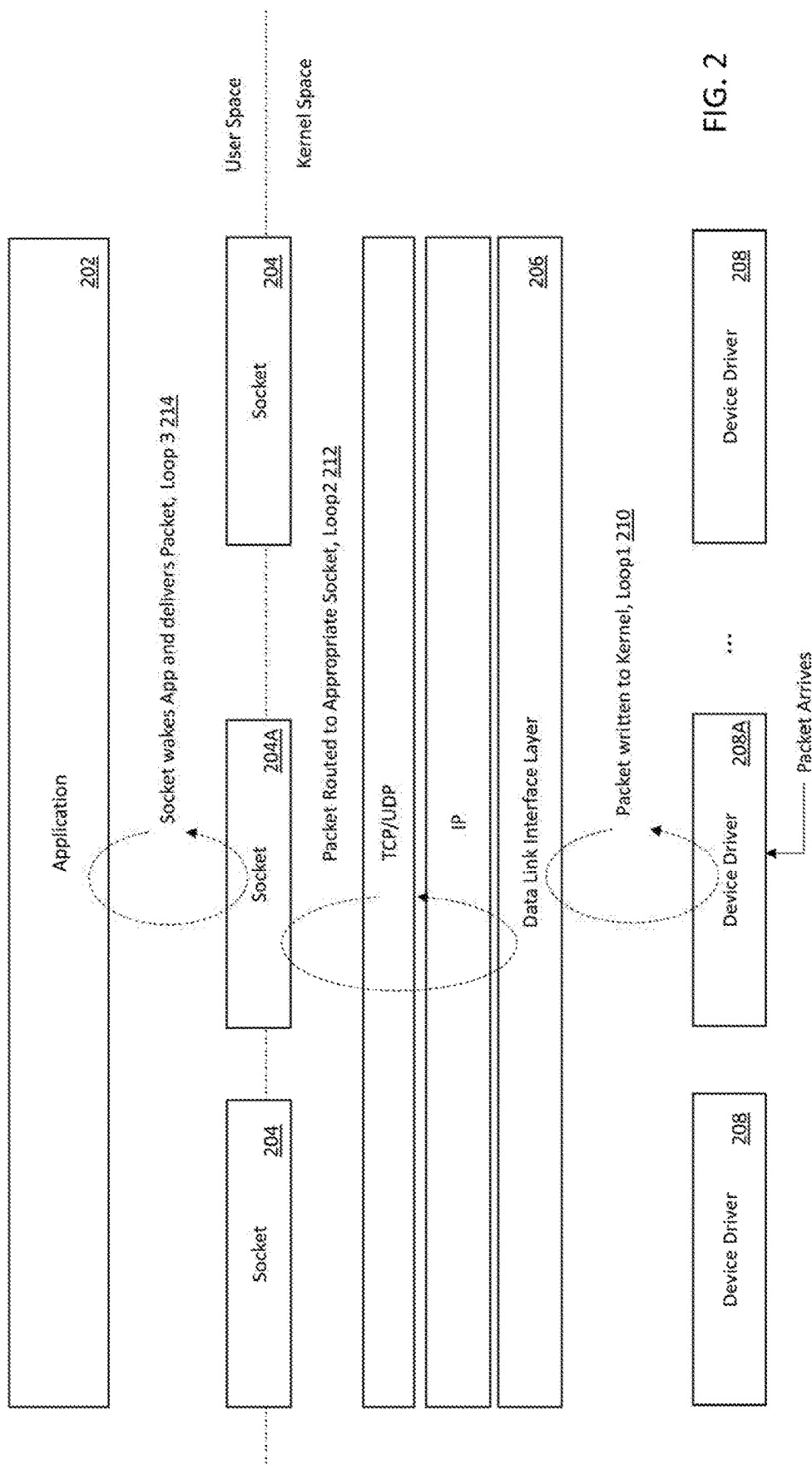
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases—

Figure 3:
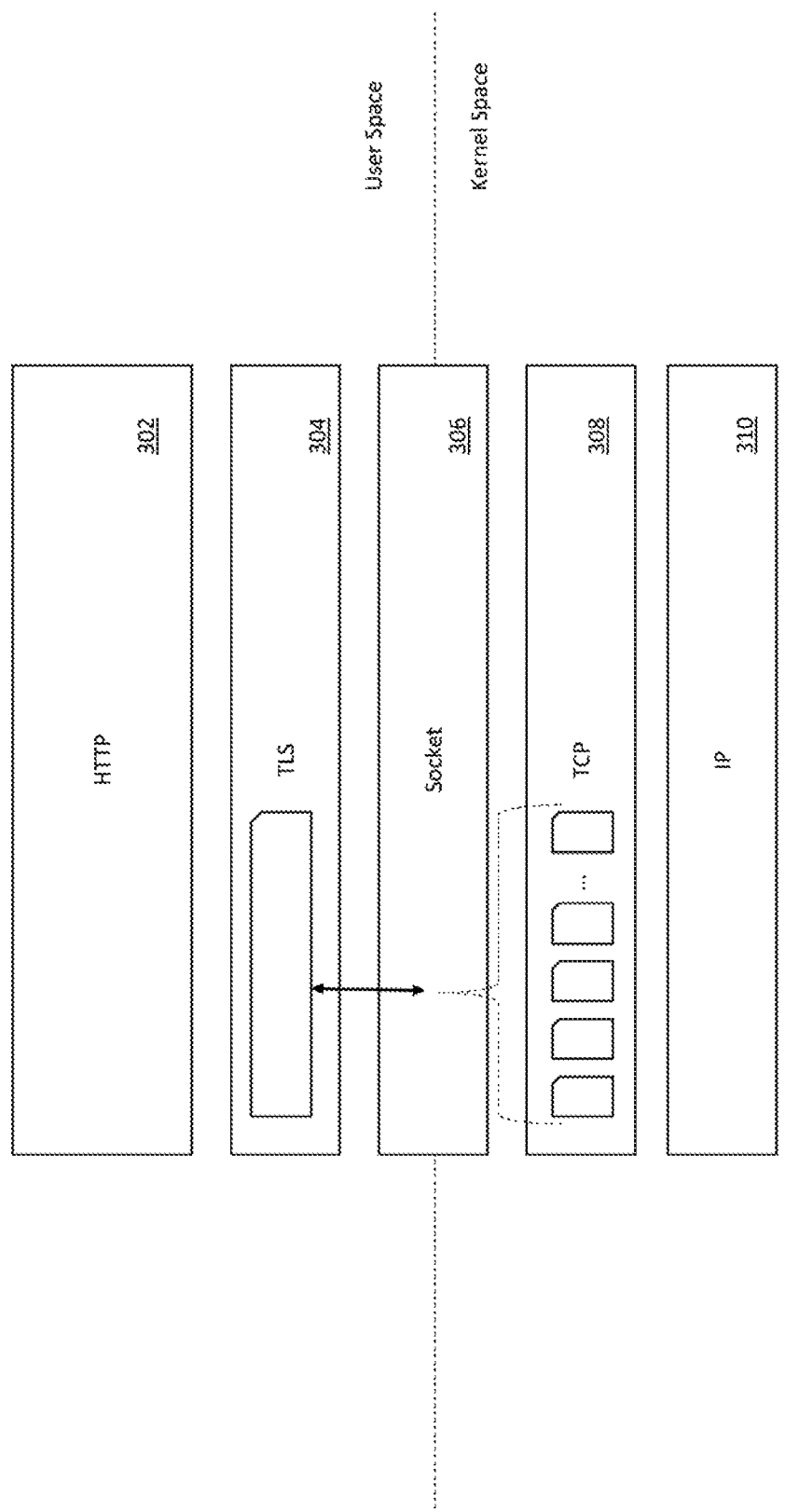
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
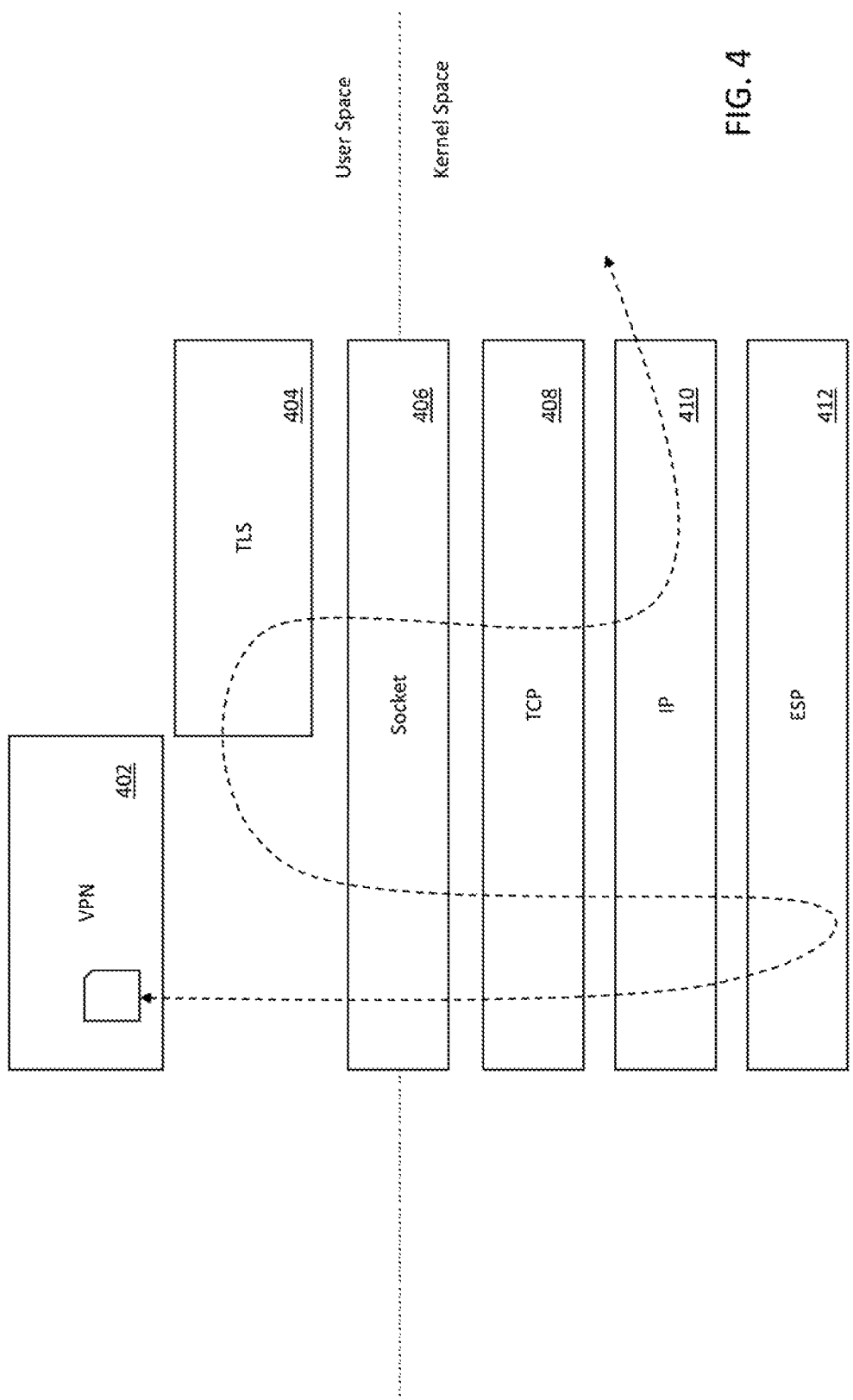
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
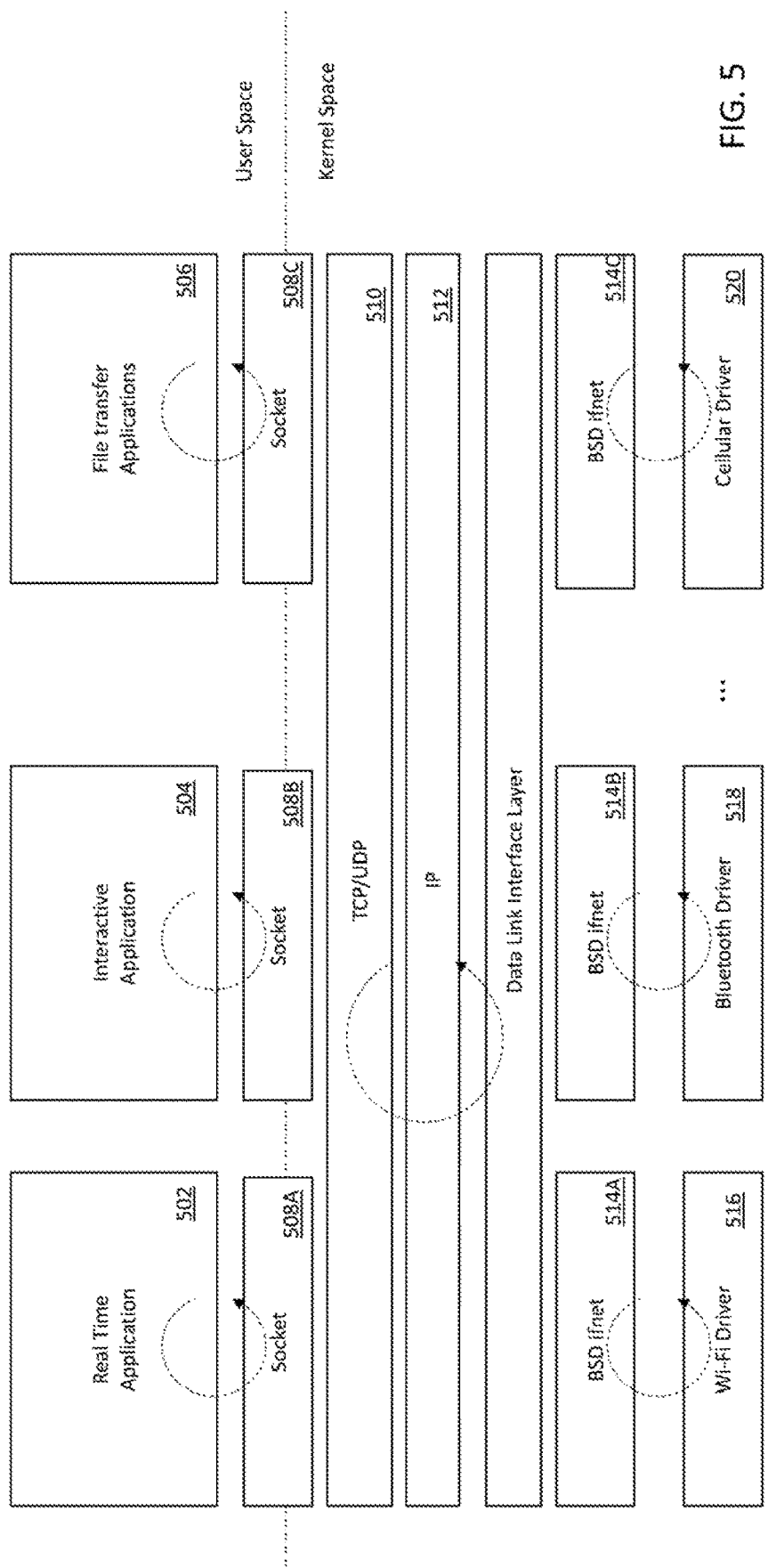
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or component. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
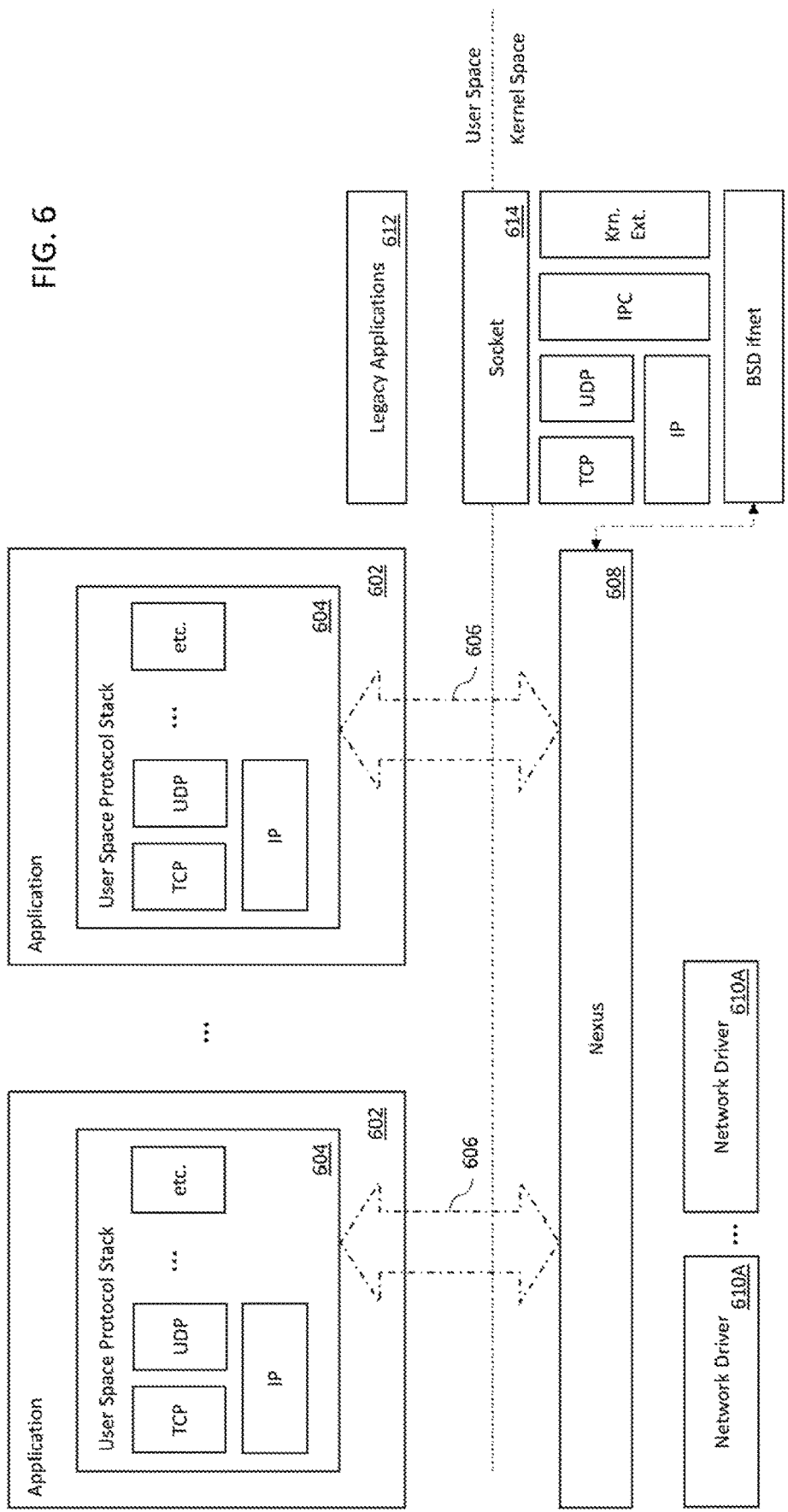
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610.

Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.)

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the nexus 608 may additionally ensure that there is fairness and/or appropriately prioritize each of its connected stacks. For example, within the context of FIG. 6, the nexus 608 balances the network priorities of both the existing user space protocol stacks 604, as well as providing fair access for legacy socket based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Onloading and Offloading, discussed infra).

Exemplary Network Extensions

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack

Figure 7:
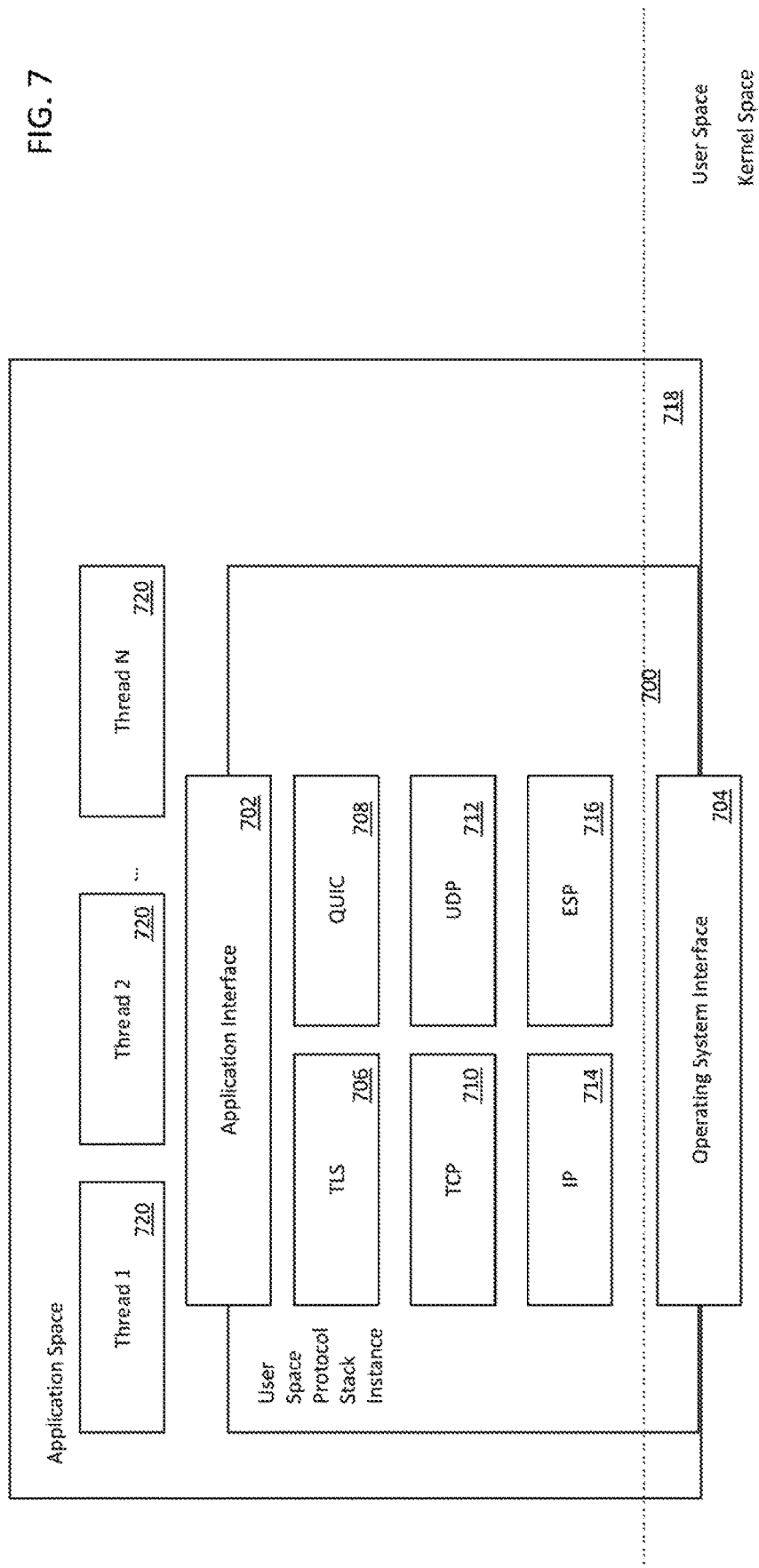
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation

Figure 8:
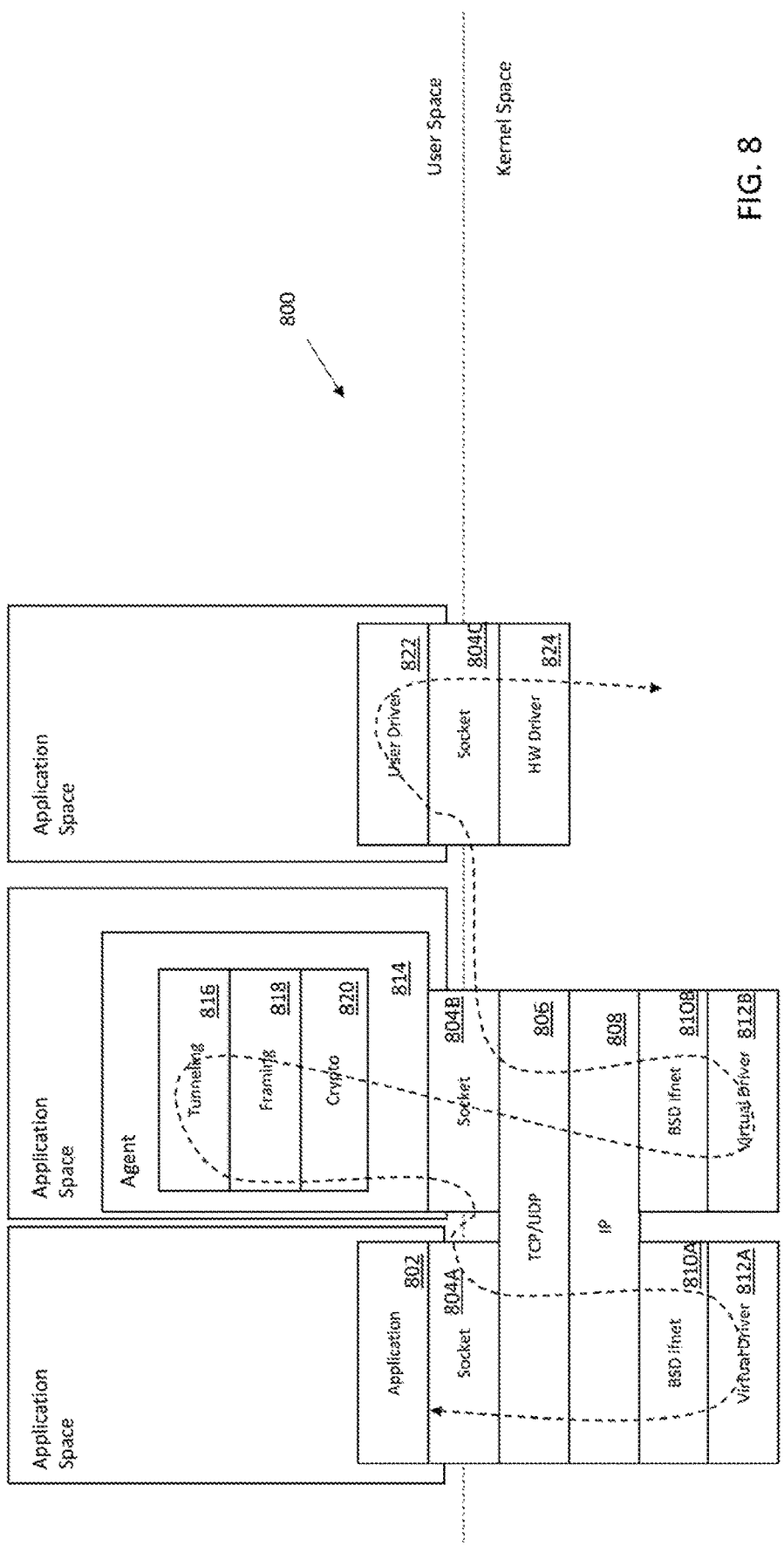
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
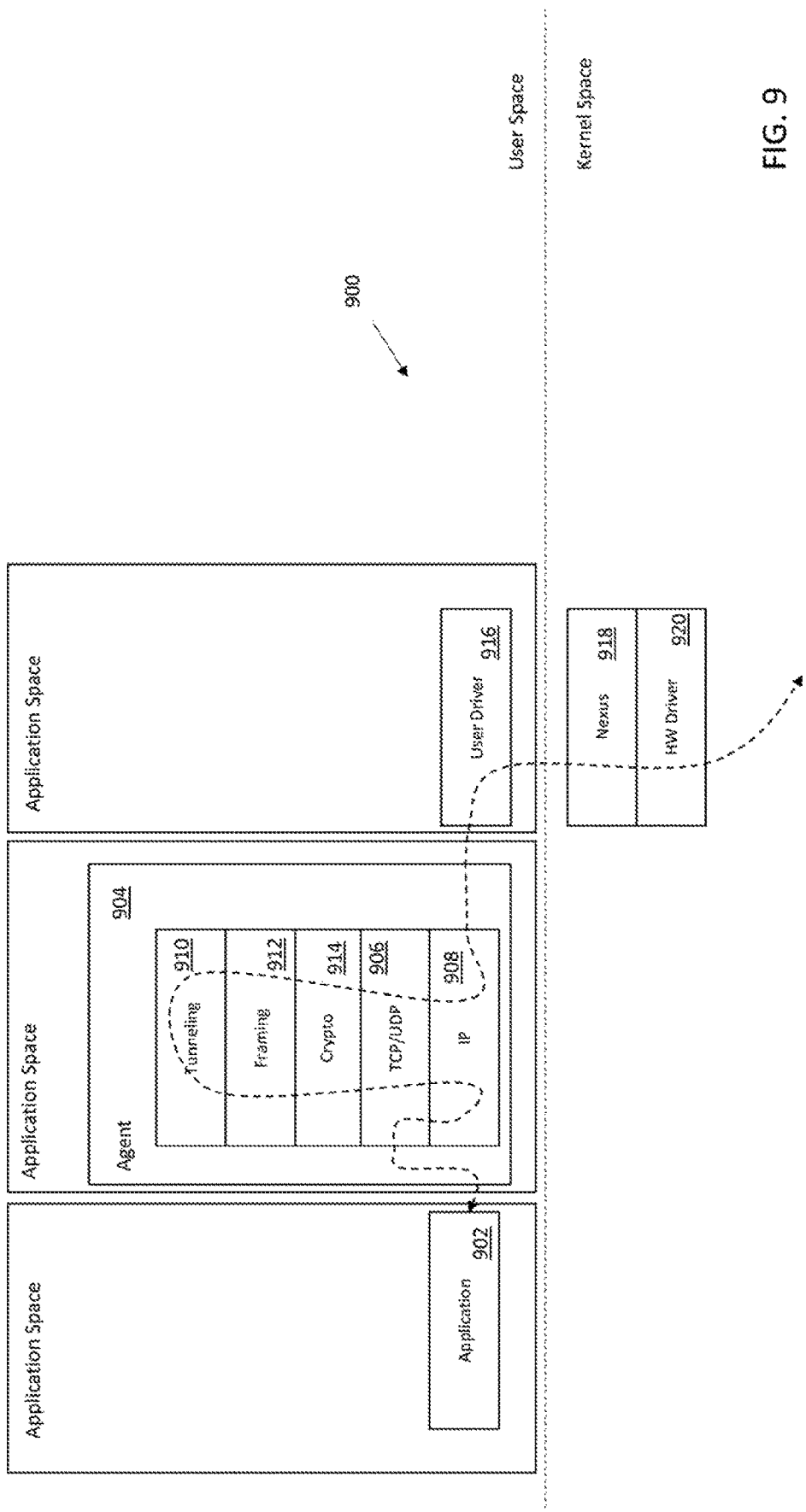
FIG. 9 is a logical flow diagram useful to summarize an exemplary proxy agent application within the context of the user space networking stack, in accordance with various aspects of the present disclosure.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Channel Defunct ("Reaping")—

In prior implementations, a single BSD stack (e.g., a TCP/IP stack) within a computing device was executed in kernel space by the O/S. Accordingly, in order for a user space application to transfer data (e.g., through a Wi-Fi interface), the user space application would need to write to a socket in order to hand over this data from the user space to the kernel space. The kernel space has the most stringent security for the system, thus limiting data transactions to the O/S in kernel space for the single BSD stack generally ensures security for the transferred data.

In some traditional operating systems, when a user space application (e.g., FaceTime, Instagram, Facebook, etc.) is "backgrounded" (or otherwise unable to receive user instruction), the resources for the user space application can be diverted to other applications. For example, the connection between user space and kernel space can be suspended, and memory resources associated with the backgrounded application can be freed for use by, e.g., other applications associated with the computing device. In some cases backgrounding does not result in immediate reclamation to prevent excessive resource "churn"; when a user space application is sent to the background, a timer is started. After a brief period of time (e.g., a few seconds), the current operational state for the user space application may be stored and the user space application may be suspended. When the application is brought back to the foreground (or otherwise enabled for user instruction), the user space application can be restored from the stored state information.

As a brief aside, user space application suspension/resumption and freeing of memory resources are typically handled via the use of so-called "daemons". Daemons are user space background applications that are persistent in memory; daemons handle various background tasks on behalf of the user such as, for example, serving incoming network connections. In some implementations, the opening and resumption of suspended user space applications would be managed through the use of a so-called launcher component (e.g., a daemon or other entity responsible for, e.g., controlling the running state of the target application) and a so-called notifier component. For example, the launcher component may be a daemon responsible for launching (and closing) user space applications, while the notifier component may be a daemon that informs the launcher component as to, for example, the background/foreground status for a given user space application.

There is one notable exception to the resumption process. Unlike applications that are self-contained to the device, networked user space applications that are suspended generally should not attempt to resume their network connectivity from their stored state. More directly, when a networked user space application stops transacting data with the network, the network may assume that the device has dropped the connection (e.g., for non-TCP transports). If the device resumes using its stored network state (e.g., with an established connection), then the device will not be in the correct state for network communications. In other words, a suspended networked user space application should not store its network state; instead its memory resources can be immediately freed so that they may be claimed by, for example, other user space applications. In the context of TCP transports, at suspension time the flow switch apparatus 1008 may go through all of the TCP flows registered for the defuncted channel and generate TCP reset packets. These reset packets will signal to other endpoints that the connections have been aborted (or suspended). By doing so, the release of memory resources may be quickly released so that they may be used by other connections.

As but one example, when an existing kernel space BSD stack suspends a network connection for a user space application, the launcher and notifier components should suspend the socket descriptor and channel descriptor for the user space application. The kernel space BSD stack should also disconnect, for example, the TCP/IP network connection for the user space application. The kernel space BSD stack can also typically free the mbufs associated with the send/receive queues for the user space application. Upon resumption of the user space application, the user space application should recognize that its network socket has lost connectivity. Thereafter, the user space application will cleanly terminate its existing socket descriptor, and re-establish a new connection. In other words, user space networked applications may treat suspension as a loss of network connectivity.

However, the assumptions of the prior single BSD stack scheme may not be particularly suitable for various embodiments of the present disclosure. In particular, a number of potential deficiencies may be introduced when user space applications instantiate their own communications stack within the user space. For example, a launcher component and/or a notifier component may notify a user space application (e.g., a third party user space application) of an impending suspension. Even though the user space applications (e.g., a third party user space application) are supposed to save their current operational state in order to implement a so-called "clean" suspension, they cannot be trusted to do so. For example, some user applications may do nothing and/or correctly suspend their state but forget to terminate the user space communications stack. In other examples, a malicious actor could conceivably refuse to free its memory resources, thereby resulting in fewer memory resources and slower operation of the computing device.

Implementations are now described which address the foregoing deficiencies associated with, for example, implementation of application communication stacks within the user space. Moreover, while the following discussion is primarily discussed in the context of terminating network connectivity via, for example, the TCP/IP communications stack, it would be readily apparent to one of ordinary skill that the present disclosure is not so limited. For example, the techniques and processes discussed herein may be readily applied to, for example, user space to user space communications (user pipes are not performed over TCP/IP). Moreover, the principles of the present disclosure may also be applied in other situations, for example, for a user space to kernel space communication (e.g., for example, a user space application using a Bluetooth driver).

Referring now to FIGS. 10A-10E, one exemplary implementation of a system for managed pool resources 1000 for use in accordance with embodiments of the present disclosure is now shown and described in detail. The system 1000 may take the form of, for example, a laptop computer (e.g., a MacBook), a desktop computer (e.g. an iMac), a tablet (e.g., an iPad), a smart watch (e.g., an Apple Watch), an audio/visual system (e.g., an Apple TV, iPod, etc.), and a smartphone (e.g., an iPhone). This exemplary system 1000 (or portions thereof) may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein. Moreover, while a specific architecture is shown in FIGS. 10A-10E, it would be readily apparent to one of ordinary skill given the contents of the present disclosure that the illustrated topology shown in FIG. 10A may be readily modified to include, for example, one or more applications 1002, one or more channels 1004, one or more pool of resources 1006 associated with a respective application, one or more flow switches 1008, and/or one or more pool of resources 1010 managed by, for example, one or more drivers 1012. These and other variants would be readily understood by one or ordinary skill given the contents of the present disclosure with the illustration contained within FIGS. 10A-10E merely being exemplary.

Figure 10A:
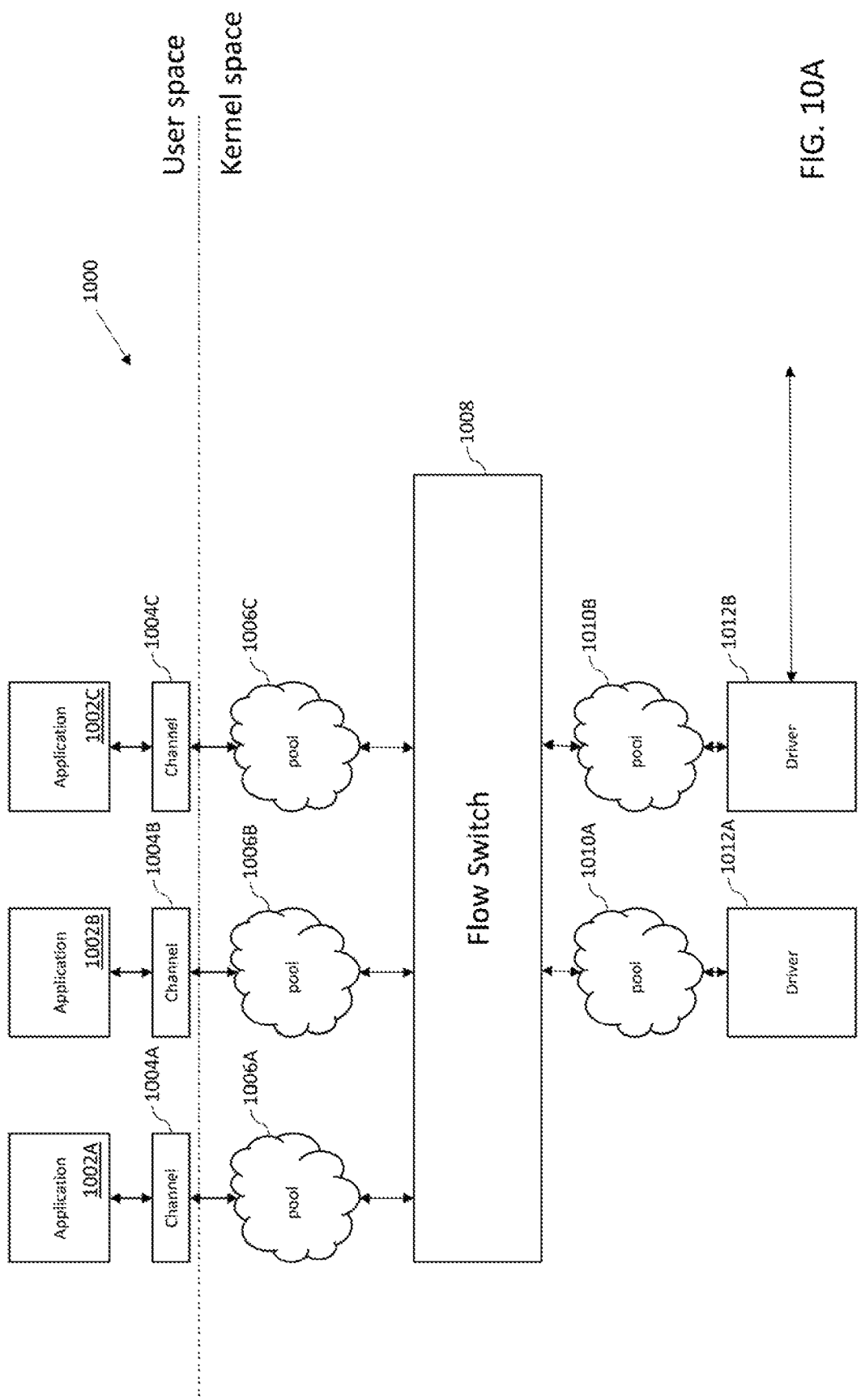
FIG. 10A is a logical representation of a system for managed pool resources, in accordance with various aspects of the present disclosure.

FIG. 10A illustrates three applications 1002A, 1002B, and 1002C that reside within user space. One or more of these applications 1002A, 1002B, and 1002C may include its own communications stack as is described in additional detail supra. Each of these applications 1002A, 1002B, and 1002C may further communicate with the kernel space through respective channels 1004A, 1004B, and 1004C which are coupled with a respective pool of dedicated resources 1006A, 1006B, and 1006C. Some (or all) of the data resident within these pools of dedicated resources 1006A, 1006B, and 1006C may be communicated to managed pools of resources 1010A, 1010B via a flow switch apparatus 1008.

As shown in FIG. 10A, each single entity managed pool of resources 1010 is separate and distinct from the pool of resources 1006 associated with respective applications 1002. The single entity 1012 may control access to the managed pool of resources 1010; for example, the single entity 1012B determines an allocation of pool resources 1010B for transferring the data stored in any one or more of pool resources 1006A, 1006B, 1006C. Similarly, each channel 1004 may control access to its managed pool of resources 1010; for example, the channel 1004 reads and writes to its corresponding allocation of pool resources 1006 for receipt/delivery.

In one exemplary embodiment, the flow switch 1008 apparatus is responsible for transferring data between pools 1006 and pools 1010. In some implementations, the flow switch apparatus 1008 may read data from one pool resource (e.g., pool 1006A) and write this data to another pool resource (e.g., pool 1010B) and vice versa. As an alternative implementation, the flow switch apparatus may redirect a pointer so as to enable data to be transferred from one pool resource (e.g., pool 1010B) to another pool resource (e.g., pool 1006A) and vice versa. In the case of trusted applications (e.g., first party applications), the single-entity managed pool of resources 1010 may be accessed directly via respective channels 1004. In some variants, this data may be compressed prior to transfer and decompressed prior to being read and/or may be encrypted prior to transfer and decrypted prior to being read. These and other variants would be readily apparent to one of ordinary skill given the contents of the present disclosure.

In some implementations, each managed pool of resources (e.g., by respective drivers 1010A, 1010B) are exclusively managed by a single entity (e.g., by respective drivers 1012A, 1012B). More directly, each driver 1012 may have exclusive control over its respective managed pool of resources 1010 and may further decide what data is transferred to/from its respective managed pool of resources 1010, along with how much data may be transferred to/from its respective managed pool of resources 1010 as well as what applications 1002 have access to its respective managed pool of resources 1010.

In some variants, the single entity may only allow unidirectional access e.g., either read from (or write to) the managed pool of resources 1010. Consequently, the single entity may allow unidirectional access e.g., either write to (or read from) the pool of resources 1006 associated with a given application. For example, driver 1012B entities may limit pool 1010B to only receiving or transmitting data.

In some alternative implementations, a pool of resources 1010 may be directly accessible via a channel 1004. Such implementations may be useful to boost the performance of trusted applications (such as so-called "first party" applications i.e., applications designed and implemented by the manufacturer of the device, "second party" applications i.e., applications designed and implemented by a trusted partner or vendor, etc.).

Figure 10B:
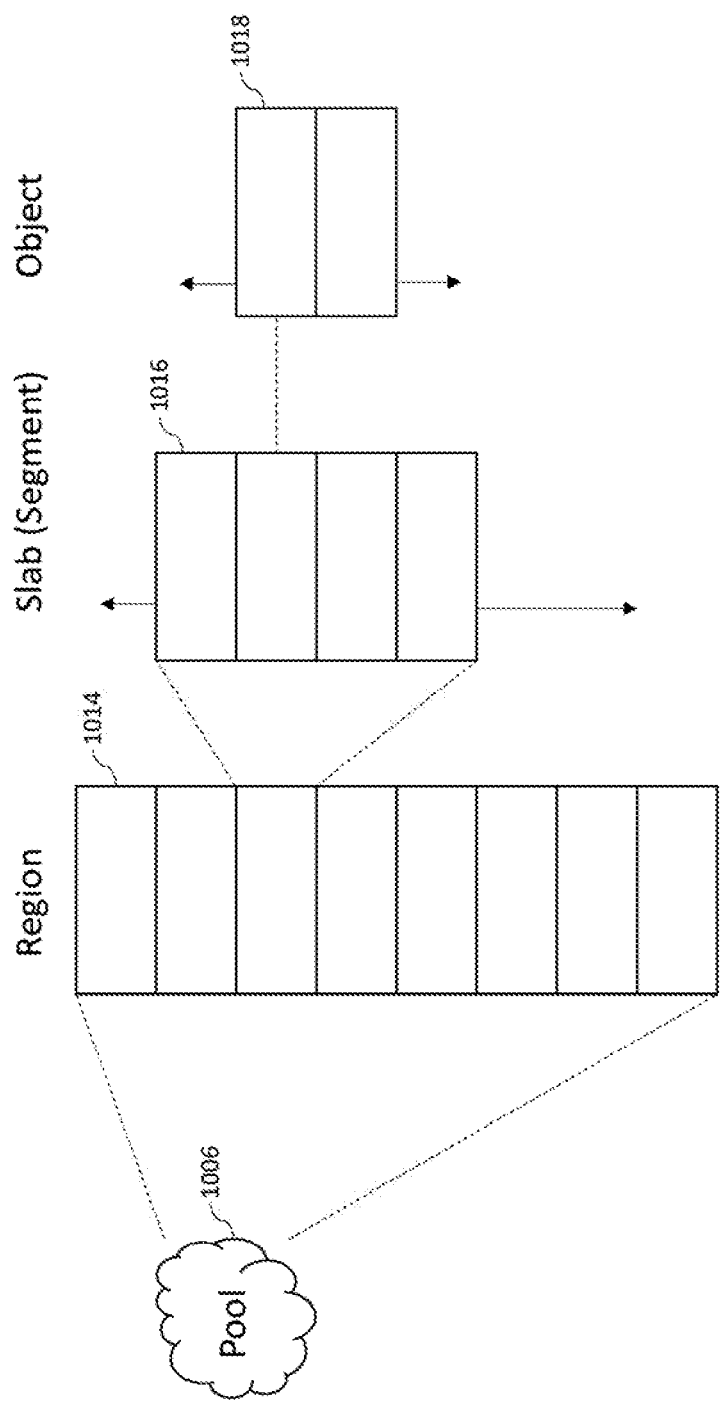
FIG. 10B is a logical representation of an exemplary pool of resources associated with an application, in accordance with various aspects of the present disclosure.

Referring now to FIG. 10B, a single entity (e.g., a driver) managed pool 1010 may be composed of an arbitrary (or predetermined) number of region(s) 1014. Each region 1014 may further be composed of an arbitrary (or predetermined) number of "slabs" or "segments" 1016. Each slab or segment 1016 may further be dynamically (or statically) mapped to a corresponding I/O address via an Input/Output Memory Management Unit (IOMMU) or DMA Address Relocation Table (DART) aperture. Moreover, each slab or segment 1016 may be dynamically (or statically) sized to accommodate a set amount of data. For example, in some implementations, each slab or segment 1016 may be dynamically sized into multiples of page size (e.g., 4 KB, 16 KB, 32 KB, etc.). Each slab or segment 1016 may further be subdivided into objects 1018 which may be established in accordance with its own dynamic (or static) sizing. For example, each object 1018 may consist of 2 KB of data and may include, for example, packet metadata, buffers and/or other memory structures as is shown in, for example, FIG. 10C. Herein lies one salient advantage of the architecture of the present disclosure, namely the ability to tailor the size of these regions, slabs and/or objects so as to most efficiently optimize the data transfers between, for example, a driver and a given application. Moreover, the application (or driver) based sizing of regions, slabs and/or objects may differ between respective applications in order to more efficiently handle these data transfers. For example, given the prior disclosed application in which the application may be required to transfer 2.5 KB of data, the size of these memory source allocations may occur in, for example, multiples of 2.5 KB.

Figure 10C:
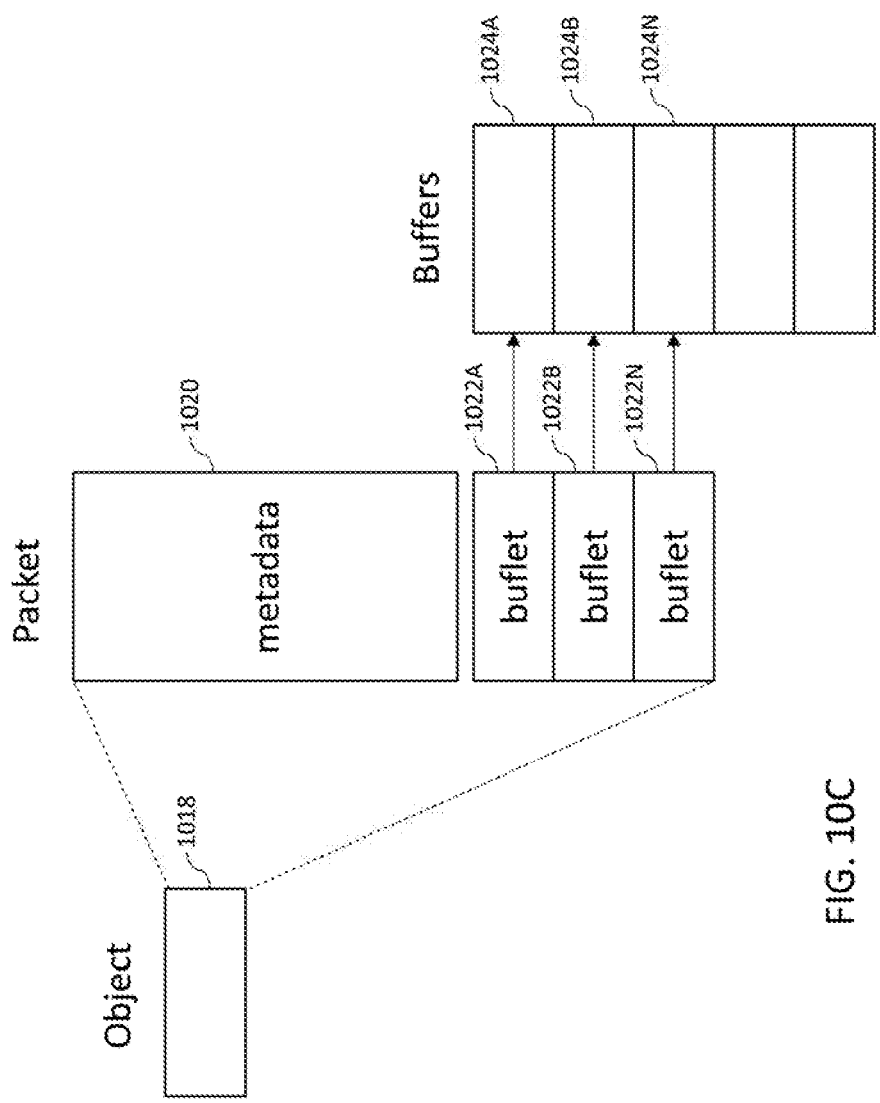
FIG. 10C is a logical representation of an exemplary object for use with the exemplary pool of resources of FIG. 10B, in accordance with various aspects of the present disclosure.

FIG. 10C illustrates an exemplary data structure for a packet object 1018. Each packet object 1018 may further be composed of metadata 1020 as well as buflets 1022A, 1022B, . . . , 1022N. The packet object metadata 1020 may be composed of descriptor data. As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information. Each packet object 1018 may further be composed of one or more buflets 1022A, 1022B, . . . , 1022N. Each buflet 1022A, 1022B, . . . , 1022N may point to a backing buffer 1024A, 1024B, . . . , 1024N in memory. Each of these pointers may be individually purgeable, wired (i.e., guaranteed to be present), or unwired (i.e., okay to purge if necessary, but otherwise kept).

As used herein, "wired" memory refers to memory allocations that are backed by actual physical memory; in contrast, "unwired" or "purgeable" memory refers to memory allocations that may be either actually present or virtually present (virtually present memory can be recalled from a larger backing memory, with a page fault penalty). Notably, the aforementioned mbufs for traditional in-kernel operation and driver I/O bounce buffers are wired memory; however, the memory allocations for channel I/O (e.g., buffers) disclosed in the various described embodiments are generally purgeable (with a few exceptions described in greater detail, infra). The ability to purge memory allocations for channel I/O can be used to facilitate memory reclamation.

The memory segments that contain the buffers 1024 pointed to by the buflets 1022 may be mapped to input/output (I/O) address space for direct memory access (DMA) operation, via the DART/IOMMU DMA mapping that occurs at the slab (segment) level. Each pool may solely be allocated to/requested by/managed by a single entity. For example, this single entity may be the aforementioned driver 1012, or may even be the application itself 1002 in some implementations. In instances in which the application 1002 manages the buflets 1022, the application 1002 may preferably be a trusted application (e.g., a first party application as opposed to, for example, a third party application). The buffer or object 1018 sizes themselves may be individually determined (and controlled) by the aforementioned single entity allowing for customized usage cases that may be dependent upon, for example, the data sizes to be transmitted to/from a respective application 1002. This dedicated mapping may also allow for direct memory mapped reads and/or writes without, for example, contention management and/or duplicate copies thereby enabling a so-called "zero-copy architecture" or reduced copy requirements. Zero-copy architectures do not copy data from one memory area to another which saves processor cycles and memory bandwidth.

For example, a device driver 1012 may require a pool of packet buffers (e.g., segment 1016) to support direct memory access (DMA) to buffered memory 1024. In order to support DMA within, for example, this shared purgeable memory; the single entity (e.g., the driver and/or application) may dynamically map segments 1016 into the Input/Output Memory Management Unit (IOMMU) or DMA Address Relocation Table (DART) aperture. In some variants, the single entity managed pool of resources 1010 may be controlled by the driver 1012 (e.g., not by the user or kernel process). Various embodiments may further allow the pool 1010 to be exclusive to the driver 1012, or shared among several drivers 1012A, 1012B. Read and write attributes may also be restricted on both the host and the device side based on the I/O direction.

Figure 10D:
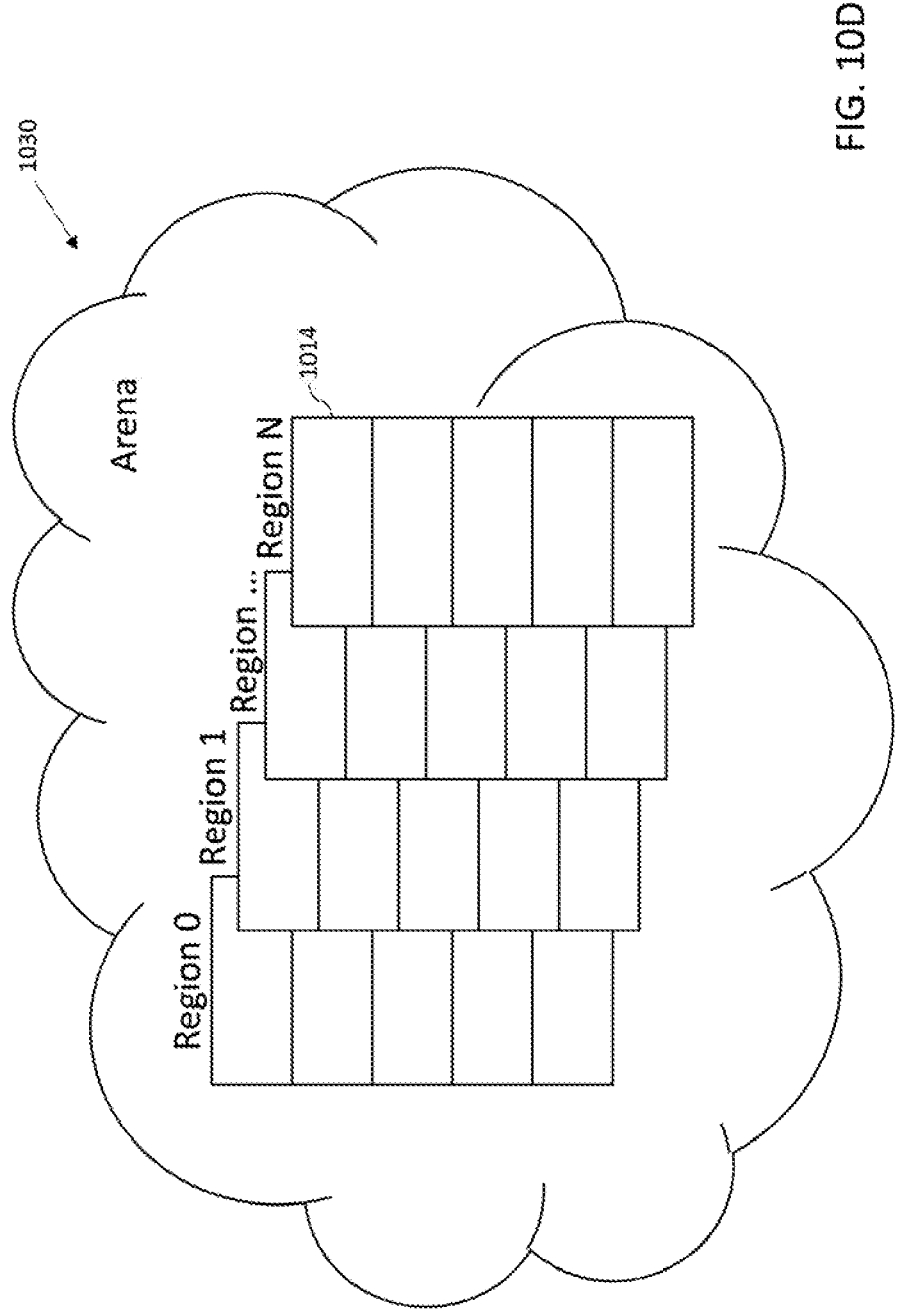
FIG. 10D is a logical representation of an exemplary arena, in accordance with various aspects of the present disclosure.

FIG. 10D illustrates an exemplary "arena" composed of a collection of regions. In particular, when a user opens a new channel, the channel I/O is allocated a new arena. The arena is composed of a number of "regions", with these regions also being allocated at the time the arena is allocated. As previously noted, each region 1014 is further subdivided into "segments" 1016; each segment 1016 is divided into objects 1018. The arena for a channel I/O contains all of the resources for the channel, for example, the pool of resources 1006 associated with a given user space application 1002 may be considered a subset of a given arena 1030.

Within this hierarchical memory structure, each of the substituent tiered memory allocations are traversed for access, allocation, and/or deallocation. For example, if a process requests an object, then the kernel determines a region, segment, etc. associated with an object, before returning an object to the process. Similarly, in order to free a segment, all of the objects of the segment must be freed. In order to free a region, all of its segments must be freed. For example, and as discussed elsewhere herein, during normal operation, there are certain circumstances where a user space application is suspended or otherwise sent into an inactive state. Within the context of the aforementioned user space memory management cleanup, a backgrounded application is usually given some amount of time in which to "gracefully" exit or resume; thereafter, the kernel will attempt to free the underlying memory allocation. This can pose significant issues for user space networking stacks which may be operating within shared memory space, and which may still hold references onto its allocated data objects. In particular, if the networking process was backgrounded and the kernel frees its objects (the kernel will forcibly free the memory objects), then the user space networking stack may not correctly recover.

Figure 10E:
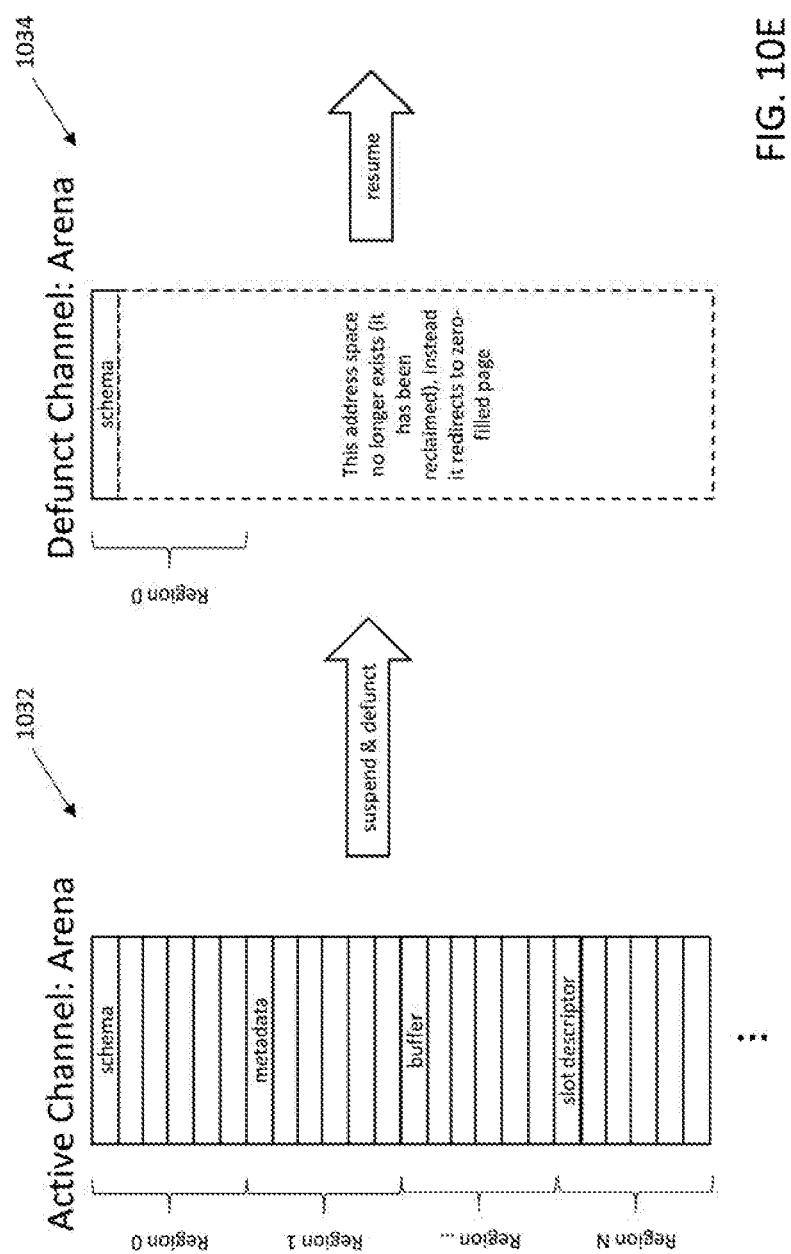
FIG. 10E is a logical representation of the exemplary arena shown in FIG. 10D illustrating both an active and defunct channel, in accordance with various aspects of the present disclosure.

As shown in FIG. 10E, the regions of the arena for a channel are mapped to a linear space of memory, with this linear space of memory being handled in the MMU to enable memory mapped I/O. For example, an active channel 1032 is composed of a number of regions; whereas a defunct channel 1034 is composed of a single region (the remaining portion of the memory redirects to, for example, a zero-filled page).

The first region of the arena (e.g., Region 0) may contain e.g., a schema, metadata, buffers, slot descriptors, etc. More generally, each region 1014 within a given arena 1030 may have different file objects, different file sizes, different file types and/or other types of data. In one exemplary embodiment, the "schema" is a data structure that is used by the kernel to identify the overall organization of the arena. The schema may include information that identifies e.g., the type of arena, the organization of data structures in the arena, and/or the status of the arena. While the following discussion is presented within the context of a particular memory allocation scheme, artisans of ordinary skill in the related arts will readily appreciate that other schemes may be substituted with equivalent success. For example, file descriptors for other operating systems may be used with equivalent success (e.g., an "inode" for Linux, Unix, etc.)

Referring back to FIG. 10E, an active channel 1032 can be suspended and defuncted into a defunct channel 1034. As part of the defuncting process, most regions of the arena can be reclaimed, however not all of the memory may be freed. For example, the schema (and other assorted other functions) may be required to remain such that the user space application can determine that the channel has been defuncted—and if so, can then be closed by the application.

As previously alluded to, traditional networking stacks are located in and managed directly by the kernel, and thus are not subject to these cross domain hazards and/or have kernel based solutions for recovery (e.g., the kernel closes the in-kernel stack process, and notifies the application via the socket (the user space application would close out the socket)). In contrast, the exemplary embodiments of the kernel mark the channel allocation as "defunct" (e.g., defunct channel arena 1034) in the channel schema. In one such implementation, the defunct arena 1034 of the channel is mapped to an identifiable pattern memory page (e.g., a zero-filled memory page) or other similarly recognizable invalid content. Thereafter, the kernel frees its underlying memory structures as is illustrated in the defunct channel arena 1034. When the task is resumed, the user space networking application will attempt to access the same channel arena 1034 using the redirected memory map; the access will succeed but will yield, for example, all-zero data. The subsystem in user space will then check the schema and determine that the channel is defunct, and inform the user space stack layer about it. The user space application detects the invalid content and gracefully handles the errors. For example, when the task is resumed, the user space shared memory accessor functions (e.g., library system call (Libsyscall) wrappers) have the logic to detect the defunct state of the channel and gracefully handle errors due to data inconsistencies.

Figure 11:
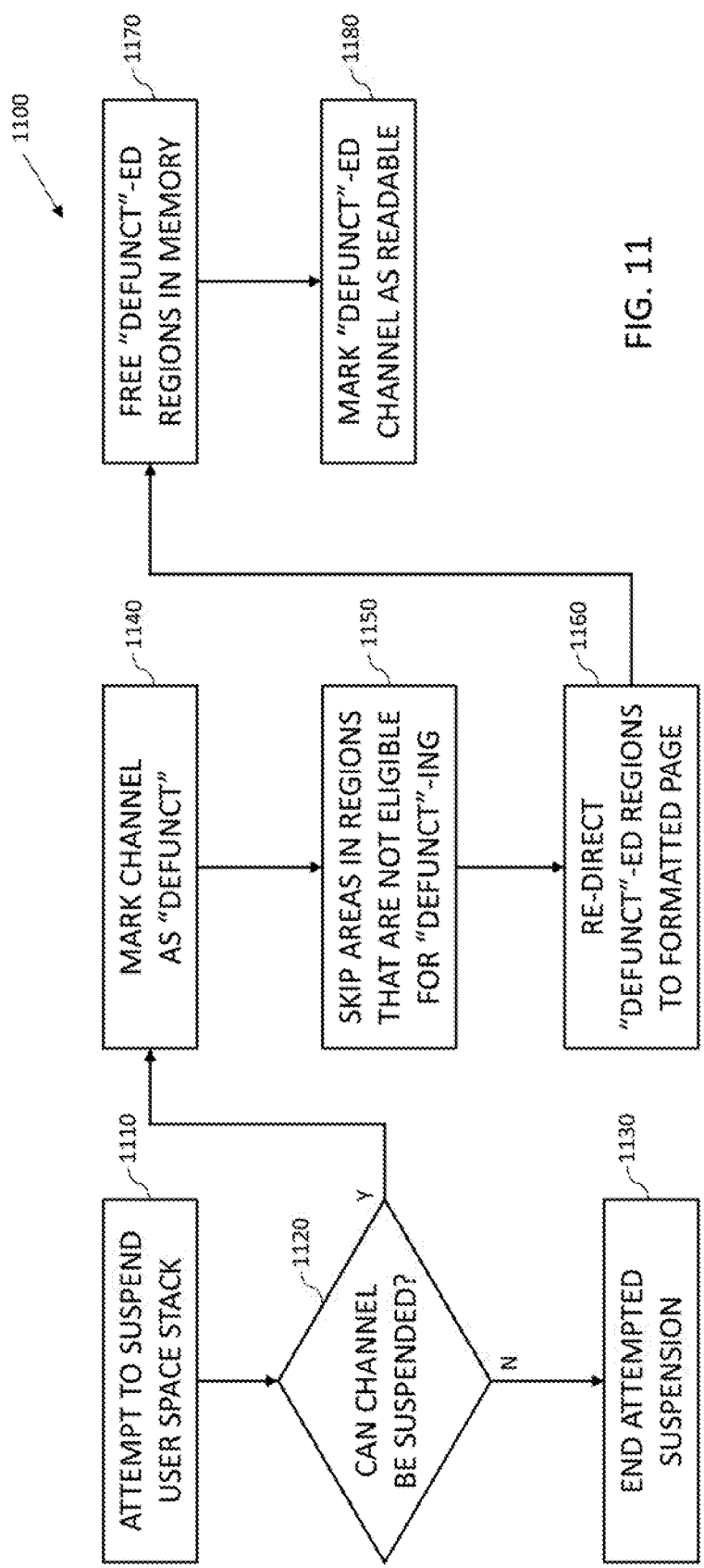
FIG. 11 is a logical flow diagram of an exemplary generalized methodology for defuncting channels, in accordance with various aspects of the present disclosure.

Referring now to FIG. 11, a logical flow diagram of an exemplary generalized methodology 1100 for defuncting channels is shown and described in detail. At operation 1110, an attempt to suspend a user space stack is made. For example, an attempt to suspend a user space stack may be made by a kernel process when a user space application is backgrounded. At operation 1120, a kernel process may determine whether or not the channel can be suspended. For example, the determination may be made based on who the developer of the application is. In this example, first party applications may not be suspended as these applications may be trusted to handle suspension gracefully, while third party applications may be suspended. As a brief aside, first party applications are typically fully owned by the developer (manufacturer) of the system 1000 itself. For example, the Assignee of the present disclosure also develops its own applications (e.g., FaceTime). So-called second party application developers may be partially owned by the developer (manufacturer) of the system itself, while third party application developers are generally independent. First (and sometimes second) party application developers may generally be more trusted, while third party application developers may generally be less trusted as compared with first or second party applications.

In still other cases, the determination may be made based on the application itself. There are certain applications that cannot be suspended. For example, user space network components must be preserved even though they are in the background.

Moreover, while the present disclosure is directed to aggressive reclamation of system resources, some implementations may selectively defunct backgrounded applications more conservatively. For example, memory constraints may be looser and/or there may be performance improvements by using state information (even if it is stale).

If the kernel process determines that the channel does not need to be suspended, the attempted suspension of the user space stack is ended at operation 1130.

If it is determined that the channel may be suspended, at operation 1140 the channel is marked (or otherwise labeled) as defunct. In some implementations, the purpose of marking the channel as defunct is in order to prevent user space accesses to the channel. For example, the channel may be labeled as defunct through one or more data structure entries located within a reserved area (e.g., a schema in a region that is not reclaimed).

At operation 1150, the kernel process checks the regions of the arena and determines which regions in the arena are not eligible for defuncting. For example, the channel schema is protected, since the channel schema may be read at a later point in time by, for example, the user application.

Various schemes for traversing the arena space for determining which areas in the arena are not eligible for defuncting are envisioned. For example, the arena space may be traversed in sequential order (e.g., from top-to-bottom, bottom-to-top, etc.). Alternatively, the arena space may be traversed in accordance with a prioritization scheme. For example, metadata associated with various entries in the arena may enable intelligent prioritization for traversing the arena space. These and other variations would be readily apparent to one of ordinary skill given the contents of the present disclosure.

At operation 1160, the defuncted regions are redirected to a formatted page of memory. For example, the formatted page of memory may include a zero-filled page. While use of a zero-filled page is exemplary, it would be readily apparent to one of ordinary skill that other formatting schemes may be implemented with equal success, the foregoing merely being exemplary as it is already understood by many user space applications that such a zero-filled page may be indicative of, for example, a loss in connection status for the user space application.

At operation 1170, the defuncted regions in memory may be freed. In other words, the defuncted regions of memory may now be reclaimed by, for example, other user space applications, etc.

At operation 1180, the defuncted channel is marked as readable. For example, marking the defuncted channel as readable will allow the application to read from the channel using, for example, one or more APIs. The APIs then may internally perform the check against, for example, the schema region which would result in the graceful return of an error. This error may be indicative that the channel is essentially "dead", resulting in a determination that a new channel may need to be opened. In other words, if the channel is not marked as readable, the application may be delayed in determining that the channel is defuncted (e.g., until the next time the application attempts to generate traffic on the channel).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for defuncting channels, the method comprising:
    determining whether a channel may be suspended based at least on a determination of whether an arena of memory resources is associated with a trusted application;
    based at least on a determination that the channel may be suspended, marking the channel as defunct for an arena of memory resources;
    defuncting portions of the arena of memory resources, and redirecting the defuncted portions to a formatted page of memory;
    freeing the defuncted portions of the arena of memory resources in order to generate a defuncted channel; and
    marking the defuncted channel as readable.

2. The method of claim 1, further comprising attempting to suspend a user space stack prior to the determining of whether the channel may be suspended.

3. The method of claim 1, wherein the defuncting of the portions of the arena of memory resources further comprises checking the arena of memory resources for areas that are not defunctable.

4. The method of claim 1, further comprising:
    enabling usage of the arena of memory resources by the trusted application prior to the marking of the channel as defunct; and
    enabling usage of the freed defuncted portions of the arena of memory resources by one or more applications other than the trusted application.

5. The method of claim 4, further comprising:
    reading at least a portion of the marked defuncted channel; and
    re-establishing another channel to another arena of memory resources for use by the trusted application.

6. The method of claim 5, wherein the re-establishing of the another channel is based at least in part on reading the formatted page of memory.

7. The method of claim 1, wherein the determination of whether the arena of memory resources is associated with the trusted application comprises a determination of whether the trusted application is a first-party application developed by a manufacturer of an apparatus on which the method is employed.

8. A system for defuncting channels, the system comprising:
    a processing apparatus; and
    a non-transitory computer readable apparatus in data communication with the processing apparatus and comprising a storage medium, the storage medium having one or more computer programs stored thereon, the one or more computer programs being configured to, when executed by the processing apparatus, cause the system to:
        mark a channel as defunct for an arena of memory resources;
        defunct portions of the arena of memory resources, and redirect the defuncted portions to a formatted page of memory, the defuncting of the portions of the arena of memory resources comprising a check of the arena of memory resources for areas that are not defunctable, the check comprising a traversal of a linear extent of memory space;
        free the defuncted portions of the arena of memory resources in order to generate a defuncted channel; and
        indicate the defuncted channel as being readable.

9. The system of claim 8, wherein the system is selected from the group consisting of: a laptop computer, a desktop computer, a tablet, a smart watch, an audio/visual system, and a smartphone.

10. The system of claim 8, wherein the one or more computer programs are further configured to, when executed by the processing apparatus, cause the system to:
    prior to the marking of the channel as defunct for the arena of memory resources, determine whether the channel can be suspended.

11. The system of claim 10, wherein the determination of whether the channel can be suspended comprises a determination of whether the arena of memory resources is associated with a trusted application.

12. The system of claim 8, wherein the formatted page of memory comprises a zero-filled memory page.

13. The system of claim 8, wherein:
    the arena of memory resources is configured to utilize, prior to the defunct of the portions of the arena of memory resources, a plurality of regions associated with a respective plurality of different types of data, the different types of data comprising two or more of: (i) schema information configured to identify an organizational data relating to the area of memory resources, (ii) metadata, (iii) a data buffer, or (iv) a descriptor; and the arena of memory resources is further configured to utilize, subsequent to the defunct of the portions of the arena of memory resources, one region comprising the schema information.

14. A non-transitory computer readable apparatus comprising a storage medium, the storage medium having one or more computer programs stored thereon, the one or more computer programs being configured to, when executed by a processing apparatus associated with a computerized apparatus, cause the computerized apparatus to:

mark a channel as defunct for an arena of memory resources;

defunct portions of the arena of memory resources, and redirect the defuncted portions to a formatted page of memory;

free the defuncted portions of the arena of memory resources in order to generate a second channel;

designate the second channel as readable; and responsive to (i) a read of the designated second channel and (ii) a read of the formatted page of memory, allow re-establishment of another channel to another arena of memory resources.

15. The non-transitory computer readable apparatus of claim 14, wherein the one or more computer programs are further configured to, when executed by the processing apparatus, cause the computerized apparatus to:

initiate an attempt to suspend a user space stack; and determine, prior to the marking of the channel as defunct for the arena of memory resources, whether the channel can be suspended.

16. The non-transitory computer readable apparatus of claim 15, wherein the determination of whether the channel can be suspended comprises determination that the arena of memory resources is not associated with a trusted application.

17. The non-transitory computer readable apparatus of claim 16, wherein the trusted application comprises a first-party application.

18. The non-transitory computer readable apparatus of claim 15, wherein the marking of the channel as defunct is configured to occur responsive to a determination that the channel can be suspended.

19. The non-transitory computer readable apparatus of claim 15, wherein the one or more computer programs are further configured to, when executed by the processing apparatus, cause the computerized apparatus to, responsive to a determination that the channel need not be suspended, end the attempt to suspend the user space stack.

20. The non-transitory computer readable apparatus of claim 14, wherein the defunct of the portions of the arena of memory resources further comprises a check of the arena of memory resources for areas that are not defunctable.

* * * * *